United States Patent [19]

Ronning

[11] Patent Number: 5,492,779
[45] Date of Patent: Feb. 20, 1996

[54] HEAT DISSIPATING BATTERY

[75] Inventor: Jeffrey J. Ronning, Fishers, Ind.

[73] Assignee: General Motors Corporation, Detroit, Mich.

[21] Appl. No.: 327,956

[22] Filed: Oct. 24, 1994

[51] Int. Cl.$^6$ ................................................ H01M 2/02
[52] U.S. Cl. .................... 429/120; 429/148; 429/176; D13/103; D13/104
[58] Field of Search .................................. 429/120, 148, 429/176, 153, 154; D13/103, 104

[56] References Cited

U.S. PATENT DOCUMENTS

| | | | |
|---|---|---|---|
| 2,385,127 | 9/1945 | Carlile | 429/148 |
| 5,131,559 | 7/1992 | Ariyoshi et al. | 220/555 |
| 5,134,046 | 7/1992 | Chow et al. | 429/176 |
| 5,209,991 | 5/1993 | Stocchiero | 429/66 |
| 5,356,735 | 10/1994 | Meadows et al. | 429/120 |

OTHER PUBLICATIONS

Patent Specification, Gutta Percha & Telegraph Works Co. Ltd. and Bertram Walkley (Britain, Great), Sep. 18. 1936.
Chernyshovii, SU–853–712, Electric Storage Battery cell vessel. H01M–2/02 (Jul. 18, 1981) (Soviet Union).

Primary Examiner—Stephen Kalafut
Assistant Examiner—Richard H. Lilley, Jr.
Attorney, Agent, or Firm—Lawrence B. Plant

[57] ABSTRACT

A valve-regulated, deep-cycling, gas-recombinant, high energy, lead-acid battery operating at superambient temperatures and internal pressures wherein the sidewalls of the battery container (i.e., intersected by the intercell partitions) are abnormally thin and reinforced against bulging by ribs which project from the container and extend in a direction transverse the intercell partitions. The ribs will preferably have a sinuous shape for optimal strength and heat transfer from the battery.

5 Claims, 3 Drawing Sheets

HEAT DISSIPATING BATTERY

This invention relates to valve-regulated, deep-cycling, gas-recombinant, high energy, lead-acid electric storage batteries destined to be ganged together in multi-battery packs for prolonged duty cycles in high power demand applications (e.g., powering electric vehicles), and more particularly to such a battery designed to readily dissipate the heat generated within the battery during charge and discharge through the sides of the battery.

BACKGROUND OF THE INVENTION

Valve-regulated, gas-recombinant, lead-acid batteries are well known in the art and comprise essentially a cell element having a plurality of positive and negative polarity plates stacked together so as to alternately interleave one polarity plate with the other and be separated one from the next by a fibrous, absorbent mat which capillarily immobilizes the electrolyte within the cell element while allowing oxygen to migrate therethrough.

It is also known to gang a plurality of high power such batteries together to form a battery pack for powering electric or hybrid-electric vehicles, and for reserve or standby power applications. In such applications, the batteries are packed closely together and air blown therebetween to remove the heat generated within the batteries over prolonged periods of usage. In this regard, lead-acid batteries are known to be particularly temperature sensitive in that exposure to elevated temperatures for prolonged periods of time is known to degrade the performance of the battery and shorten its useful life. Accordingly, it is desirable to remove the heat generated within the battery as quickly as possible, both during charging and discharging, with the goal being to have the battery's operating temperature be as close as possible to ambient temperature.

The ability to remove heat from the innards of gas-recombinant batteries is particularly difficult because the separator between the positive and negative plates of a gas-recombinant battery cell element absorbs and immobilizes the electrolyte, which, in turn, serves to help retain heat within the innards of the cell element. In this regard, flooded-electrolyte batteries which do not have electrolyte-absorbent mats have an inherent cooling mechanism built therein in that the electrolyte is free to circulate within the battery. Convective circulation incident to localized heating of the electrolyte carries the heat generated within the centermost regions of the cell element to the extremities thereof where it can be more readily dissipated through the container walls. Without the assistance of a mobile electrolyte, removal of heat from the centermost regions of the cell element of a gas-recombinant battery is dependent primarily on conduction through the materials comprising the cell element. The structure of the cell element, however, is such that the heat flows in directions parallel to the plates at a rate approximately four times greater than the rate heat flows in the direction perpendicular to the plates. This is due primarily to the fact that the lead grids supporting the active material of the positive and negative plates have a relatively high thermal conductivity and extend continuously to the periphery (i.e., top, bottom and sides) of the cell element. Heat flow in the direction perpendicular to the plates is impeded by the separator, the interplate gap and any overpasted active material. Accordingly, in gas-recombinant batteries, the most effective region for extracting heat from within the cell element is around the periphery of the element. Unfortunately, compared to the ends of the cell element which have a relatively high surface area, the periphery of the element (i.e., where the plates emerge) presents a relatively small surface area from which to extract the heat. To compensate for this smaller peripheral area (i.e., so that one can effectively remove heat from within the cell element via the periphery thereof) it is important that the heat be removed at a rapid rate. It is imperative therefor that the thermal resistance between the cell element's periphery and the outside surface of the battery's container (i.e., where forced convective cooling is available) be minimized.

The thermal resistance between the periphery of the cell element and the outside surface of the battery container is made up of two principal components, (1) the sidewall of the container, and (2) the gap between the periphery of the cell element and the inside surface of the container sidewall. Both of these components typically comprise materials having relatively poor thermal conductivity, and hence their thermal resistance is significantly affected by their respective thickness. The thermal resistance resulting from too thick a sidewall can be reduced by making the sidewall as thin as possible. The gap between the cell element and the sidewall, however, is a particular problem in valve-regulated batteries which operate at superambient pressures (e.g., 1.5 psi or more). The internal pressure can cause sidewalls which are too thin/weak to bulge outwardly and, in so doing, increase the size of the gap between the periphery of the cell element and the inside surface of the container sidewall. Such an increased gap increases the temperature drop ($\Delta t$) across the gap, and negates any benefits that might otherwise be derived from reducing the thickness of the sidewall. This problem is exacerbated at superambient temperatures which tend to reduce the strength of the material comprising the sidewall and hence its ability to resist bulging.

It is an object of the present invention to provide a valve-regulated, deep-cycling, gas-recombinant, high energy lead-acid battery operating at superambient internal temperatures and pressures which is capable of effectively conductively dissipating heat generated within the cell elements through the sidewalls of the battery container with a minimum of thermal resistance contributed by the battery container sidewalls and internal spacing of the cell element from the container sidewalls. It is a further object of the present invention to enhance the ability of such sidewalls to dissipate such heat into a cooling medium flowing by the sides of the battery.

These and other objects and advantages of the present invention will become more readily apparent from the detailed description thereof which follows.

BRIEF DESCRIPTION OF THE INVENTION

The present invention contemplates a readily coolable, valve-regulated, deep-cycling, gas-recombinant, high energy (e.g.,>ca. 50 amp-hrs.), lead-acid battery destined for a prolonged duty cycle at superambient internal pressures and temperatures. The battery of the present invention is intended to be ganged with a plurality of similar batteries in a battery pack having cooling air blown between the several batteries of the pack. The battery of the present invention includes a typical gas-recombinant-type cell element (i.e., alternately interleaved positive and negative polarity plates and electrolyte absorbent interplate separator) placed in each of a plurality of contiguous, aligned cell compartments formed in a thermoplastic, prismatic, monobloc container. The container comprises a pair of opposing end walls, a pair of opposing sidewalls extending between the end walls, and a plurality of intercell partitions extending parallel to the end walls and engaging the sidewalls so as to define the individual cell compartments. In accordance with the present invention, the sidewalls have a thickness which is quite thin (i.e., less than 2 mm) compared to industry norms for such sidewalls, and less than about the thickness of the intercell partitions. To permit this without increasing thermal resistance to the outflow of heat incident to bulging of the sidewalls, the sidewalls include a plurality of outwardly projecting external ribs projecting and extending in directions transverse the partitions. The ribs both reinforce thin sidewalls against bulging and, like radiator fins, increase the external heat transfer surface area of the battery sidewalls. By preventing the thin sidewalls from bulging, the gap between the periphery of the cell element and the inside surface of the container sidewall will not increase, and hence the thermal resistance attributed to such gap will not increase as the temperature and internal pressure of the battery increases.

The sidewall ribs will preferably extend in a direction which is substantially perpendicular to the partitions, and will most preferably have a sinuous configuration which not only provides (1) increased resistance to bulging, and (2) increased surface area for cooling, but also induces more turbulent air flow thereacross for still more effective extraction of heat from the battery. The external reinforcing/cooling ribs on the sidewalls will preferably have widths which are about, or less than, the thickness of the sidewall for reduced mass, better moldability and better heat conduction. The height of the rib above the surface of the sidewall is determined by the strength required and the available space within the battery pack, and will generally be less than about 4 mm. In accordance with a preferred embodiment of the invention, the battery container will comprise polypropylene homo- or co- polymers, and the sidewall thickness will be less than about 1.8 mm. A sidewall thickness of 1.5 mm or less is most preferred.

DETAILED DESCRIPTION OF A SPECIFIC EMBODIMENT OF THE INVENTION

The invention will better be understood when considered in the light of the following detailed description of a specific embodiment thereof which is provided hereafter in conjunction with the several figures in which.

Figure 2:
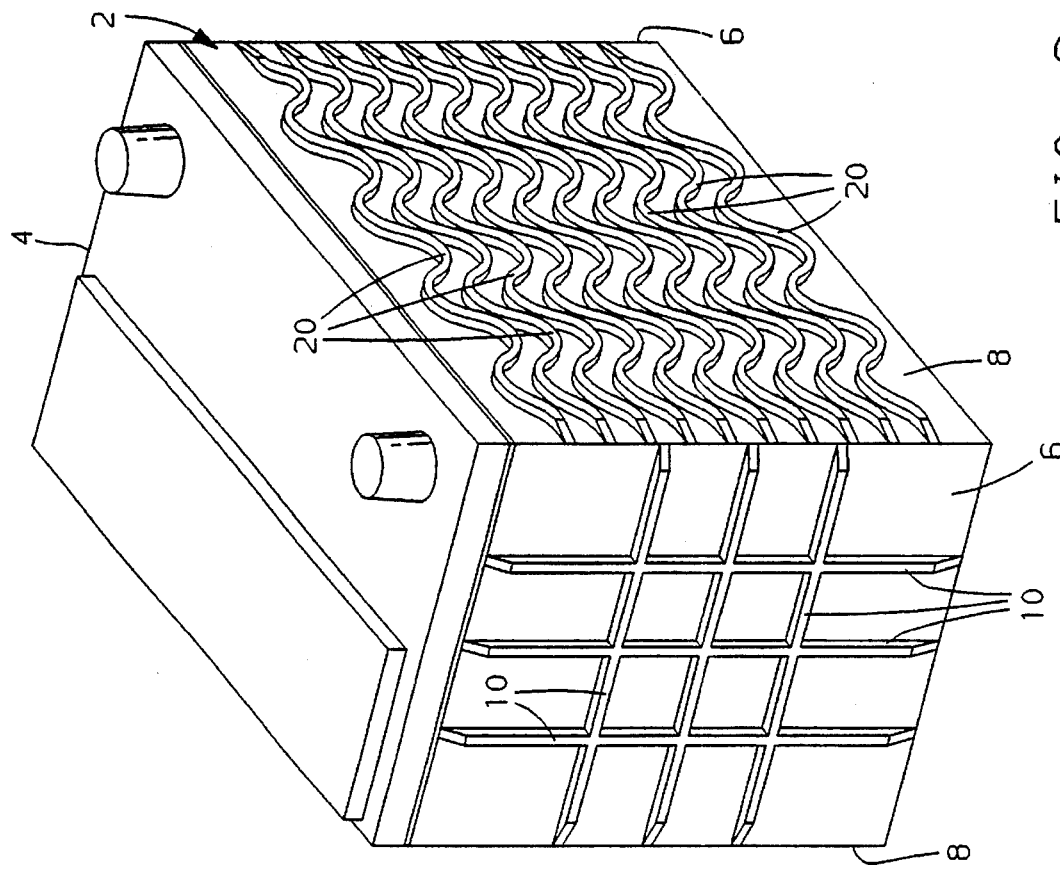
FIG. 2 is a perspective view of a second embodiment of a battery in accordance with the present invention.
Figure 1:
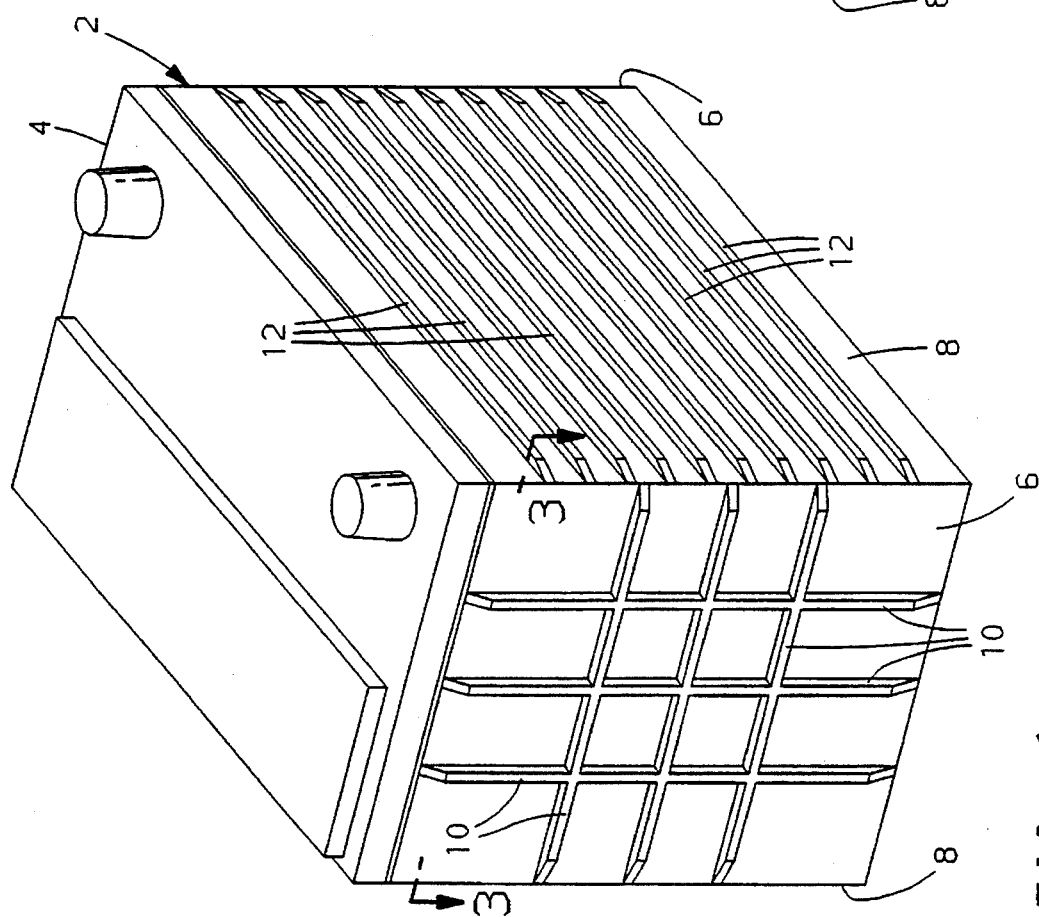
FIG. 1 is a perspective view of one embodiment of a battery in accordance with the present invention.
Figure 3:
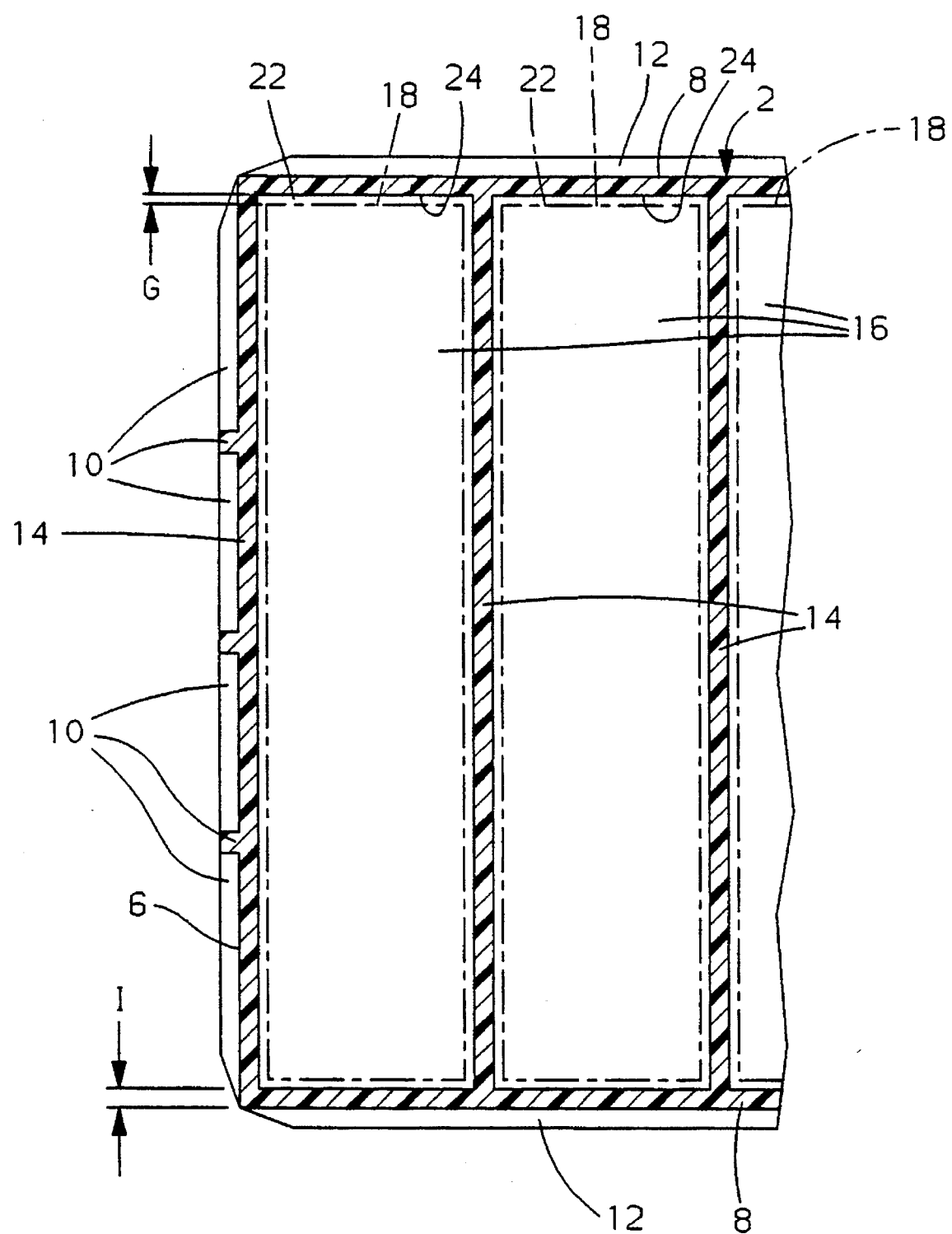
FIG. 3 is a view in the direction 3—3 of FIG. 1.

FIGS. 1 and 2 depict a battery comprising a container 2 and a cover 4. The container comprises opposing end walls 6 on opposite ends of the container 2, and opposing sidewalls 8 extending between the end walls 6. The end walls 6 have a network of reinforcing ribs 10 on the face thereof to prevent bulging of the end walls 6 in accordance with well known practice for reinforcing end walls of battery containers. The sidewalls 8 of the container depicted in FIG. 1 include a plurality of straight ribs 12 which extend the length of the sidewall 8 in a direction transverse to the intercell partitions 14 (see FIG. 3). The partitions divide the container 2 into a plurality of individual cell compartments 16 each of which houses a battery cell element 18 shown in phantom in FIG. 3. The ribs 12 will preferably extend in a direction perpendicular to the partition 14 for ease of manufacture and aesthetics, but could also angle (e.g., 45°) across the face of the sidewall 8 if so desired. As best shown in FIG. 2, the ribs 20 projecting from the sidewall 8 will preferably have a wavy or sinuous shape which serves to (1) provide increased reinforcing against bulging of the sidewalls between the partition 14, (2) increase the effective heat transfer surface area for more effective removal of heat from the battery, and (3) induce turbulence in the cooling air which is blown across the face of the sidewall 8 for still more effective extraction of heat from the battery.

Figure 4:
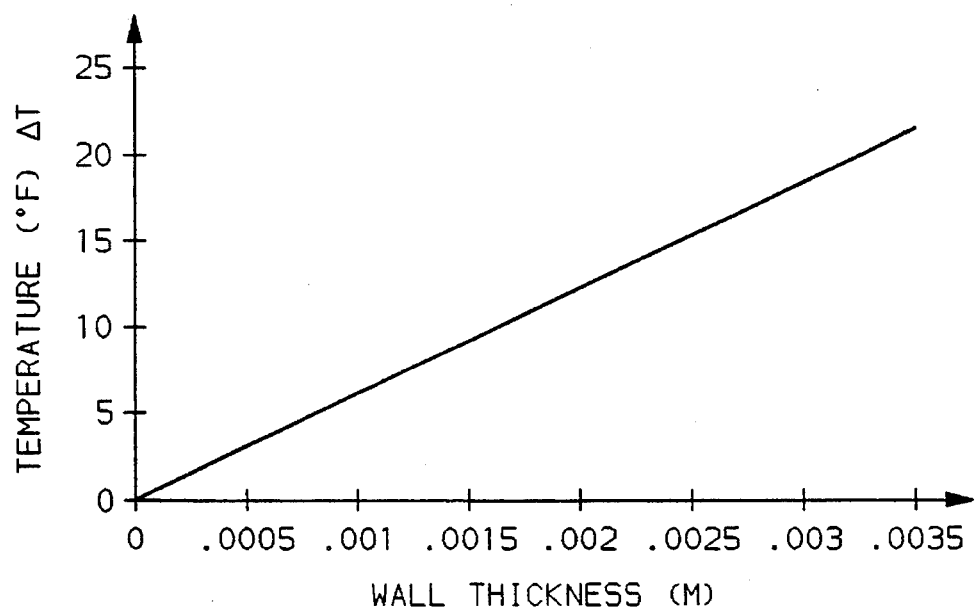
FIGS. 4 and 5 are graphs which respectively show the thermal resistances (i.e., measured in temperature drop at room temperature) of a polypropylene container sidewall and the gap between the periphery of the cell element and the sidewall.
Figure 5:
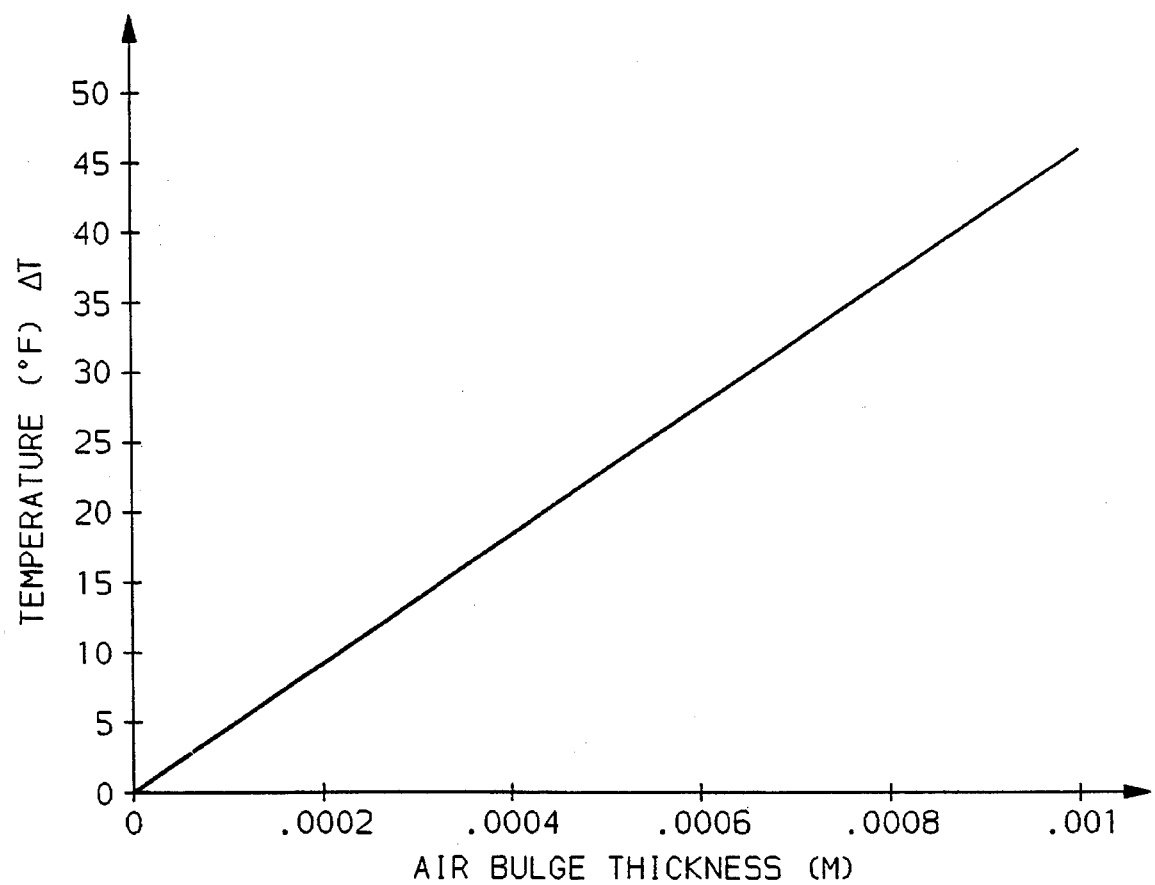

The sidewalls 8 (i.e., between the ribs 12 and 20) will preferably be as thin as possible consistent with the strength requirements for the container and limitations of the molding process. In this regard, FIG. 4 is a plot of the thermal resistance (i.e., temperature drop—$\Delta T$) of a polypropylene battery container wall as a function of the thickness of such wall. As FIG. 4 indicates, the temperature drop, and hence the resistance to heat flow, increases as the wall thickness increases such that, for example, the thermal resistance of a wall 2 2.5 mm thick is 66% greater than a wall thickness of 1.5 mm. Similarly, FIG. 5 is a plot of the temperature drop, and hence the thermal resistance, attributed to bulging of the sidewalls which increases the gap between the periphery 22 of the cell element 18 and the inside surface 24 of the sidewall 8 as a function of the size of that bulge. Hence for example it will be seen that when the sidewall bulges six tenths of a millimeter (0.6 mm), the temperature drop is more than five times (5×) greater than if the sidewall bulged only one tenth of a millimeter (0.1 mm). If the sidewall 8 is allowed to bulge outwardly, this gap increases and results in a greater resistance to heat flow therethrough. Hence, in accordance with the present invention, in order to minimize the temperature drop between the periphery 22 of the cell element 18 and the outside surface of the sidewall 8, the gap between the periphery 22 and the inside surface 24 as well as the thickness of the sidewall 8 is made as small/thin as possible. To accomplish this, the sidewall 8 is made as thin as possible while being reinforced against bulging outwardly by providing reinforcing ribs 12, 20 on the outside of the sidewall 8, which ribs 12, 20 also serve to increase the heat transfer surface area of the sidewall 8 for maximum rejection of the heat generated within the battery.

While the invention has been disclosed primarily in terms of certain specific embodiments thereof, it is not intended to be limited thereto, but rather only to the extent set forth hereafter in the claims which follow.

The embodiments of the invention in which an exclusive property or privilege is claimed are defined as follows:

1. In a valve-regulated, deep cycling, gas-recombinant, high energy, lead-acid battery operating at a superambient internal pressure and temperature, said battery having a plurality of cell elements each comprising a plurality of alternately interleaved positive and negative polarity plates spaced one from the next by an electrolyte-absorbent separator and housed in one of a plurality of contiguous cell compartments in a thermoplastic, prismatic, monobloc container, the improvement wherein said container comprises a pair of opposing end walls, a pair of opposing sidewalls extending between said end walls, and a plurality of intercell partitions extending parallel to said end walls and engaging said side walls so as to define said cell compartments, said sidewalls having a thickness which is less than the thickness of said partitions, and a plurality of ribs projecting outwardly from said sidewalls and extending in a direction transverse said partitions to reinforce said sidewalls from bulging under the influence of said superambient pressure and increase the rate of heat transfer out of said battery.

2. A battery according to claim 1 wherein said ribs extend in a direction substantially perpendicular to said partitions.

3. A battery according to claim 2 wherein said ribs have a sinuous configuration.

4. A battery according to claim 1 wherein the width of said ribs is less than said thickness of said sidewall.

5. A battery according to claim 2 wherein said thermoplastic comprises polypropylene, and said wall thickness is less than about 1.8 mm.

* * * * *